United States Patent [19]
Greller

[11] Patent Number: 5,873,965
[45] Date of Patent: Feb. 23, 1999

[54] PROCESS AND DEVICE FOR CARRYING OUT A WELDING PROCESS ON THERMOPLASTIC MATERIAL WEBS

[75] Inventor: Peter Greller, Enkenbach-Alsenborn, Germany

[73] Assignee: G.M. Pfaff Aktiengesellschaft, Kaiserslautern, Germany

[21] Appl. No.: 120,160

[22] Filed: Sep. 10, 1993

[30] Foreign Application Priority Data

Sep. 16, 1992 [DE] Germany .......................... 42 30 882.8

[51] Int. Cl.⁶ .................................................. B32B 31/00
[52] U.S. Cl. ........................... 156/64; 156/358; 156/555; 156/583.1
[58] Field of Search .............................. 156/64, 358, 359, 156/361, 362, 555, 583.1; 100/93 R

[56] References Cited

U.S. PATENT DOCUMENTS

| | | | |
|---|---|---|---|
| 4,533,423 | 8/1985 | Johnson et al. | 156/359 |
| 4,786,353 | 11/1988 | Templeton et al. | 156/359 |
| 4,820,365 | 4/1989 | Brumm et al. | 156/359 X |
| 4,923,558 | 5/1990 | Ellenberger | 156/358 X |
| 5,051,148 | 9/1991 | Resch | 156/358 |
| 5,072,097 | 12/1991 | Miller | 156/359 X |
| 5,217,561 | 6/1993 | Ueda et al. | 156/359 |

FOREIGN PATENT DOCUMENTS

| | | |
|---|---|---|
| 392 607 B | 5/1991 | Australia . |
| 40 20 704 C1 | 11/1991 | Germany . |

*Primary Examiner*—James Engel
*Attorney, Agent, or Firm*—McGlew and Tuttle

[57] ABSTRACT

In a process and a device for carrying out a welding process on thermoplastic material webs, the value of the pressing force ($F_r$) of a pair of pressure rollers is determined as a measured value representing the weld seam thickness and is used as the actual value of the controlled variable of a welding process regulating unit, and it is compared with a corresponding set value. The feed speed (V) of the welding device is used as the correcting variable of this regulating unit by increasing the speed in the case of decreasing weld seam thickness and decreasing the speed in the case of increasing weld seam thickness to compensate a possibly existing deviation.

14 Claims, 2 Drawing Sheets

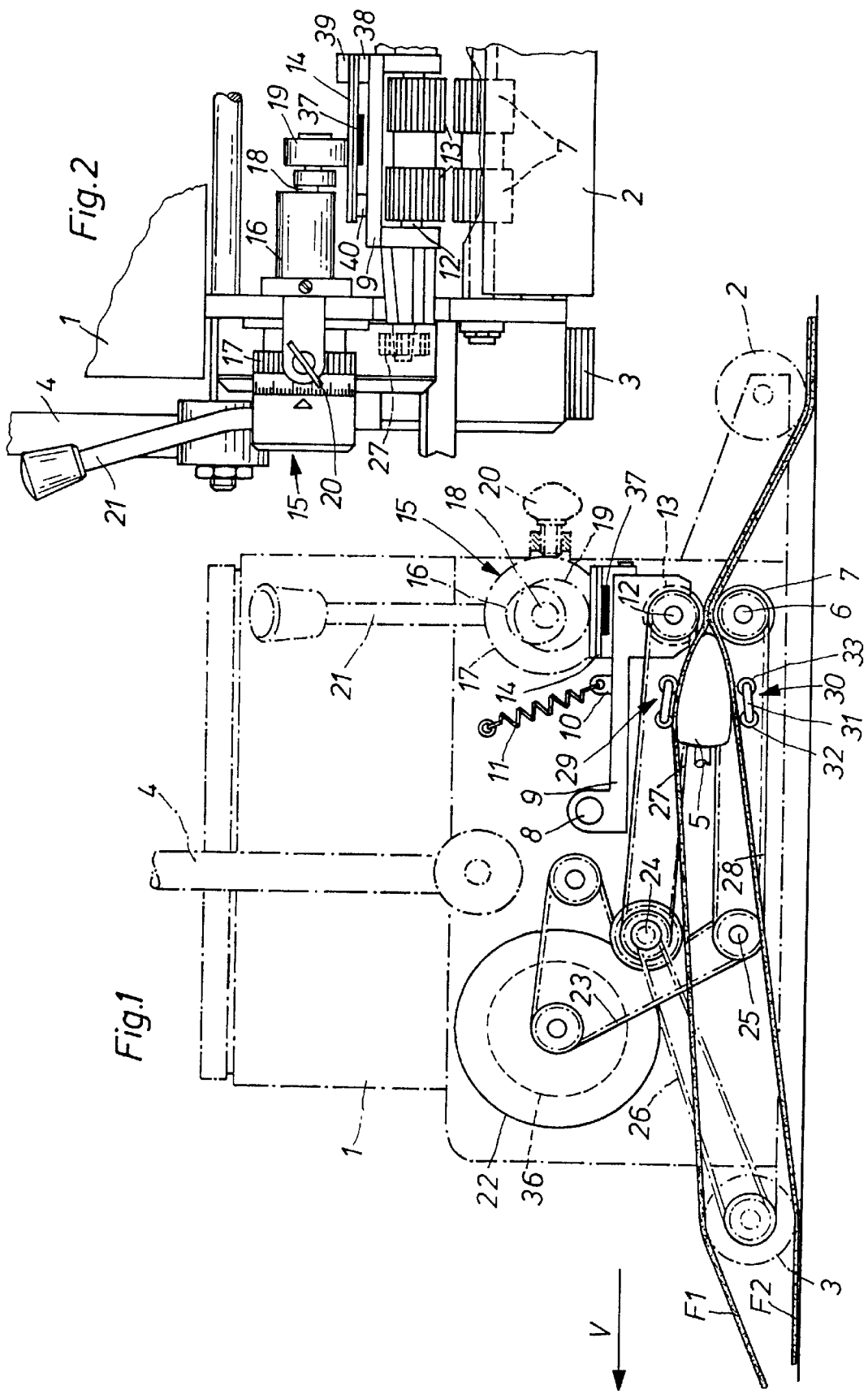

PROCESS AND DEVICE FOR CARRYING OUT A WELDING PROCESS ON THERMOPLASTIC MATERIAL WEBS

FIELD OF THE INVENTION

The present invention pertains to a process and a machine for carrying out this process, the process involving regulating the connection of thermoplastic material webs wherein a welding machine is used equipped with a welding tool and a pair of pressure rollers, in which the speed of the pressure rollers brings about a relative movement between the material webs and the welding machine.

BACKGROUND OF THE INVENTION

It was found that in the case of lap welding of thermoplastic material or sealing webs intended for lining landfills, the weld seams prepared without welding filler have the required optimal weld strength only when the weld thickness $D_N$ is between an upper limit $D_{NO}=D-0.2$ mm and a lower limit $D_{NU}=D-0.6$ mm, in which D is the sum of the thicknesses $d_1$ and $d_2$ of the unwelded material webs. The weld thickness $D_N$ is smaller than the sum D due to the fact that part of the plasticized material is pressed out of the welding gap by the pressing force applied by the pressure rollers on the partial areas of the material webs, which are heated to the welding temperature and thereby plasticized. If the required reduction in thickness or the upper limit $D_{NO}$ was not reached during welding, the material was not heated sufficiently in the welding gap, and consequently it was not sufficiently plasticized, as a consequence of which the weld seam did not have the necessary strength. In contrast, if the weld thickness was below the lower limit $D_{NU}$, the material was heated too intensely, as a consequence of which the strength was impaired by notch effect at the weld margins. The above-mentioned limit values for the weld thickness are independent from the thickness of the material webs usually used to line landfills.

In the process for carrying out welding processes on thermoplastic material webs intended for lining landfills, which has been known from DE 40 20 704 C1, the welding process is carried out automatically at an essentially constant welding gap temperature by measuring the heated wedge temperature regulation by influencing the energy supply to the heated wedge in the case of deviations of the actual temperature value from the set value, and additionally regulating the feed when the actual temperature value exceeds or drops below a set point range.

Since the heated wedge temperature, which represents the controlled variable in this regulation, does not make it possible to obtain direct information on the quality of the weld seam, the required weld seam quality can be achieved only by adjusting the actual value of the welding temperature and the settings for the feed speed and the pressing force of the pressure rollers as accurately as possible to the influences of the environmental conditions, and especially to the starting temperature of the material webs, as well as to the material-specific properties. In a simple version of the regulating system, this is done by the operator. In an automated version, the environment-specific influential factors are determined by corresponding sensors, after which the computer of the regulating system determines the correct welding temperature set value by means of the measured values and the influencing variables entered via a keyboard.

Another requirement for achieving the required weld seam quality is that the actual value of the welding temperature be determined, if possible, without delay. However, this requirement is satisfied only very imperfectly in the simple version, because the welding temperature is measured within the heated wedge rather than in the welding gap so that the welding gap temperature, which is actually the temperature that is of interest, is determined only indirectly and with a time delay. In contrast, the dead time caused by the measuring technique in the control circuit is compensated in the automatic version by the measure that the regulating system is able to respond prospectively to a greater change in the starting temperature of the material webs due to the fact that the starting temperature of the material webs is measured at a spaced location in front of the welding site.

While the determination of the set value is circumstantial in the simple version, and the regulating system responds very sluggishly because of the time delay in temperature measurement, the automated version requires a relatively high technical effort, and it is also subject to the restriction that the determination of the starting temperature of the material webs is susceptible to disturbances due to contamination of the material webs or to moisture.

SUMMARY AND OBJECTS OF THE INVENTION

The primary object of the present invention is therefore to provide a process and a device for carrying out a welding process, by which process and device high weld seam quality is achieved in a simple, yet reliable manner.

According to the invention, a process is provided for regulating the connection of thermoplastic material webs by means of a welding machine equipped with a welding tool and a pair of pressure rollers, the pressure rollers being variable in speed to bring about a relative movement between the material webs and the welding machine. The process involves forming a measured value representing the weld seam thickness and comparing the measured value as an actual value of the controlled variable with a corresponding set value upon observing deviations, the deviations are compensated by changing the value of the heat flux into the material webs by decreasing the heat flux in the case of decreasing weld seam thickness and increasing the heat flux in the case of increasing weld seam thickness.

Due to the feature that the measured value representing the weld seam thickness is used as the controlled variable, the decisive quality criterion of a weld seam, namely, the ratio of the weld seam thickness and the sum of the thicknesses of the unwelded material webs, is used for regulation. The effect of all the influential factors relevant for the weld seam quality, i.e., the weld seam thickness, are determined indirectly, without separate measurement processes, and are taken into account when the regulation is performed.

Even though the weld seam thickness can be determined directly by a thickness measurement, it is advantageous to determine the weld seam thickness indirectly by measuring the pressing force if the welding machine is already equipped with a measuring device for measuring the pressing force of the pressure rollers for determining and recording the welding parameters. The fact is utilized here that there is a fixed relationship between the value of the pressing force of the pressure rollers, which is set at a defined value at the beginning of the welding process, and the actual thickness of the weld seam, such that the spring means of the adjusting mechanism is somewhat released with decreasing weld seam thickness, after which the measured pressing force decreases, whereas it increases with increasing weld seam thickness.

Since certain materials, e.g., PEHD films, are sensitive to overheating and therefore can be welded satisfactorily only within a very narrow welding temperature range, it is advantageous, when a heated wedge is used, to maintain the temperature of the heated wedge at a defined, optimal value by means of a temperature regulation device, and to adjust the value of the amount of heat to be transmitted to the material webs, which becomes necessary in the case of a change in the environmental conditions by correspondingly changing the relative speed between the material webs and the welding machine. This manner of changing the amount of heat can be accomplished in a relatively simple manner, contrary to the other possibilities available for varying the amount of heat to be transmitted, namely, the variation of the size of the contact surface between the heated wedge and the material webs, because there is a possibility of adjusting the speed of rotation of the pressure rollers and possibly even of the runners in any welding machine, anyway.

Even though a welding machine intended for welding together asphalt-coated masking webs has been known from U.S. Pat. No. 5,072,097, in which the amount of heat released by a welding tool onto the masking webs is influenced by varying the feed speed, this is done as a function of the temperature of the welding tool as well as the ambient temperature, and it does not affect the process according to the present invention.

The measure according to which the command variable for controlling the speed of rotation of the pressure rollers and possibly of the runners is formed by a set value-actual value comparison of the measured value representing the weld seam thickness, guarantees that the required feed speed of the welding machine will be maintained on ascending and descending slopes of the terrain as well.

The speed of the motor used to drive the pressure rollers is adjusted only when the actual value (force value) drops below or exceeds a lower or upper set value during a selectable time period. This feature makes it possible to pass over transient disturbances, e.g., variations in the thickness of the material webs, which could otherwise lead to an erratic regulating behavior and nonuniform operation of the welding machine.

According to the invention, an advantageous machine is provided including a motor driven structure with pressure rollers for bringing about the relative movement between the material webs and the welding machine. Pressure force adjusting means is provided for adjusting the pressing force of the pressure rollers. A force sensor is provided for measuring the pressure applied by the pressure rollers to the material webs. The force sensor is connected to a first input of a computer. The computer compares the actual values supplied by the force sensor with a set value sent to a second input and the computer generates adjusting signals for the motor depending on the result of the set value—actual value comparison. A tachometer generator is provided which determines the actual speed value of the motor. An amplifier is also provided, the computer forms the speed regulating unit for the motor and forms a command variable for the speed regulating unit. The command variable seeks to adjust the actual value of the pressing force to the set value of the pressing force based on the difference between the set value and the actual value of the pressing force and from the difference between the set value and the actual value of the speed.

It is still a further object of the invention to provide a welding machine and process which are dependable in operation and form uniform seams between fusable thermoplastic material webs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS i the drawings:

FIG. 1 is a side view of the welding machine;

FIG. 2 is a front view of part of the welding machine;

DETAILED DESCRIPTION OF THE PREFERRED EMBODIMENT

Figure 3:
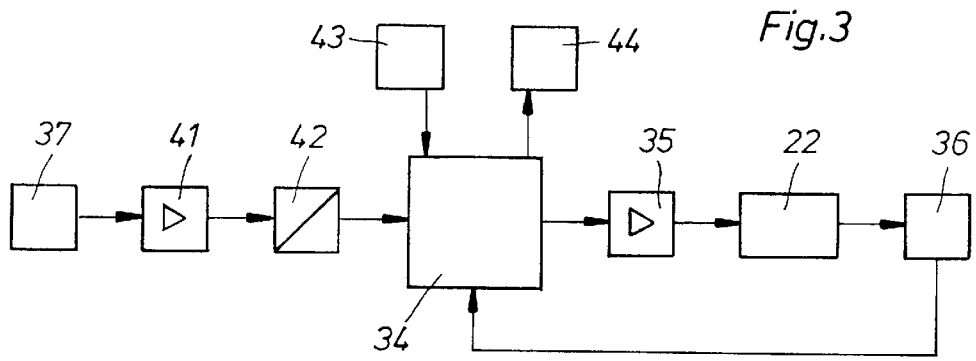
FIG. 3 is a circuit diagram of the regulating system.

The mechanical design of the welding machine corresponds to that of the welding device according to German Utility Model DE-GM 88 05 783. Consequently, the welding machine has a housing 1, which is represented by dotted lines in FIG. 1, with a freely rotatable runner 2 being arranged at the rear end of the housing 1 when viewed in the direction of feed V, and with two driven rollers 3, located at spaced locations from one another, being arranged at the front end of the housing. A hand strap 4, by means of which the operator can handle the welding machine, and which is represented only partially, is arranged on the housing 1.

The welding machine contains as the welding tool an electrically heated wedge 5, which can be moved to and fro between the working position shown in FIG. 1 and a resting position that is remote therefrom by means of the mechanism known from DE-GM 88 05 783.

A pressure roller 7 is attached to a shaft 6 mounted in the housing 1. A pivoting frame 9 is mounted on a bolt 8 fastened in the housing 1. A tension spring 11, the other end of which is attached to the housing 1, acts on a projection 10 of the pivoting frame 9. A shaft 12, which carries a pressure roller 13 arranged in it nonrotatably, is accommodated in the pivoting frame 9. A laminated spring assembly 14 is arranged on the pivoting frame 9. A pressing mechanism 15, which is represented only schematically, but is described in DE-GM 88 05 783 in detail, is arranged on the housing 1; the pressing mechanism 15 has a first eccentric shaft 16, a flange 17 connected thereto, a second eccentric shaft 18 mounted rotatably in the first eccentric shaft 16, and a pressure roller 19, which is arranged on the pressing mechanism 15 and is supported on the leaf spring assembly 14. After releasing a locking screw 20 securing the rotation position of the flange 17, the eccentric shaft 16 can be rotated together with the eccentric shaft 18 by means of a lever 21, and the basic setting of the gap height between the two pressure rollers 7 and 13 can thus be performed. When the flange 17 is clamped, only the inner eccentric shaft 18 is rotated by the lever 21, and the necessary pressing force of the pressure rollers 7, 13 is thus adjusted.

A variable-speed d.c. motor 22, which drives two shafts 24 and 25 via a chain drive 23, is arranged on the housing 1. A chain drive 26 used to drive the two runners 3 is driven via the shaft 24. The shaft 24 is also in drive connection via a chain drive 27 with the shaft 12 carrying the upper pressure roller 13. In the same manner, the shaft 25 is in drive connection with the shaft 6 driving the lower pressure roller 7. The chain drives 26, 27 and 28 are adjusted to one another such that the runners 3 and pressure rollers 7, 13 driven by them have the same circumferential velocity.

An upper pressing mechanism 29 and a lower pressing mechanism 30 are associated with the heated wedge 5 located in the working position. The pressing mechanisms 29, 30 are of identical design and consist of a spring-tensioned support 31 that can be moved at right angles to the longitudinal axis of the heated wedge 5 and of a front and a rear, freely rotatable pressure roller 32 and 33, respectively.

A computer 34 is provided for operating the welding machine; on the one hand, the computer 34 forms—in conjunction with a heat sensor (not shown) measuring the heated wedge temperature—a temperature regulating unit, which is a prior-art regulating unit for the electrically heated wedge 5, and therefore is not explained in detail, and, on the other hand, it is used to form a command variable for controlling the speed of the motor 22.

The speed control circuit of the motor 22 contains an amplifier 35 acting as a final control element and a tachometer generator 36, which is connected to the motor 22 and is used to determine the actual speed value. The tachometer generator 36 is designed as a digital pulse generator and can therefore be directly connected to an input of the computer 34. If a tachometer generator generating a voltage corresponding to the speed were used, the analog measured value would have to be converted into a digital form by means of an A/D converter for further processing in the computer. Due to the constant transmission coupling of the runners 3 and the pressure rollers 7 and 13 to the motor 22, the actual value of the motor speed also forms the actual value of the feed speed V of the welding machine.

To measure the pressing force of the pressure rollers 7, 13 on the overlapping sections of two material webs F1, F2, a force sensor 37, which is formed by a wire strain gauge and measures the deflection of the leaf spring assembly 14 caused by the action of the pressing force, is arranged on the underside of the leaf spring assembly 14. To enable the leaf spring assembly 14 to undergo such a deflection, it is arranged in a bridge-like manner according to FIG. 2, by attaching one end of the leaf spring assembly 14 to the pivoting frame 9 via a spacer 38 and a shim 39 arranged at a vertically spaced location from the pivoting frame 9, while the other end is supported on the pivoting frame 9 via a spacer 40. The force sensor 37 is connected to an input of the computer 34 via an amplifier 41 and an A/D converter 42. A keyboard 43 and a display unit 44 are also connected to the computer 34.

Mode of Operation

Before a welding process is performed, the operator determines the suitable set values $T_S$, $V_S$, and $F_S$, for the welding temperature T, the feed speed V, and the pressing force F with which the pressure rollers 7, 13 press the overlapping sections of the material webs F1, F2, corresponding to the type and thickness as well as the starting temperature of the material webs F1, F2 to be welded together. The set values can be selected from tables and/or on the basis of welding tests. The set values $T_S$ and $V_S$ selected are now entered into the computer 34 via the keyboard 43. The pressing force F is adjusted manually by means of the lever 21 while material webs are being fed in between the rollers 7, 13, while the leaf spring assembly 14 is bent via the eccentric shaft 18 and the pressure roller 19, and, as a consequence of this, the pressure roller 13 mounted in the pivoting frame 9 is pressed against the overlapping sections of the material webs F1, F2, which sections lie on the pressure roller 7. The longitudinal extension occurring as a result of the deflection on the underside of the leaf spring assembly 14 is determined by the force sensor 37, and an analogous measured value, which is proportional to the force deforming the leaf spring assembly 14, is formed from it. This measured value is fed into the computer 34 via the amplifier 41 and the A/D converter 42 and is displayed by it on the display unit 44 in numerical form in "Newton" units.

Since the set value $F_S$ of the pressing force is adjusted to the required weld seam thickness $D_N$ of the weld seam, and this weld seam thickness $D_N$ is smaller than the sum D of the thicknesses d1 and d2 of the unwelded material webs F1 and F2, the set value $F_S$ of the pressing force, which is to be maintained later, during the welding process, cannot yet be selected prior to the beginning of a welding process, when the material webs F1, F2 are not yet heated and are therefore rigid, but the pressing force must be set to the initial value $F_A$, which is greater than the set value $F_S$ by the $D/D_N$ ratio.

The temperature of the heated wedge 5 is maintained extensively at a constant value in the known manner during welding by means of the computer 34 and the temperature regulating unit, so that this welding parameter can be considered to be a constant magnitude, which is irrelevant for the subsequent considerations.

With the beginning of welding, a flat zone of the sections of the two material webs F1, F2, which is in contact with the heated wedge 5, is heated to the welding temperature and thereby plasticized. Due to the feed movement of the welding machine, brought about by the motor 22, the plasticized partial areas of the material webs F1, F2 then enter between the two pressure rollers 7, 13, are pressed together by them, and are welded together. Since part of the plasticized material is pressed out of the welding gap to the side, the thickness $D_N$ of the weld seam decreases correspondingly compared with the sum D of the thicknesses d1 and d2 of the unwelded material webs F1 and F2. As was explained in the introduction, it is necessary for the weld seam thickness $D_N$ to be between the upper limit $D_{NO}$=D–0.2 mm and the lower limit $D_{NU}$=D–0.6 mm to obtain a satisfactory weld seam. The average weld seam thickness $D_N$ is now $D_{NM}$=D–0.4 mm.

To the extent that the pressure rollers 7, 13 compress the material in the weld seam, the upper pressure roller 13 moves away from the pressure roller 19 of the pressing mechanism 15. As a consequence, the leaf spring assembly 14 is slightly released, its deflection decreases somewhat, and the pressing force between the pressure rollers 7, 13 decreases from the higher initial value $F_A$ to a lower value, which is the set value $F_S$ in the optimal case.

If the set values $T_S$, $V_S$, and $F_S$ for the heated wedge temperature T, the feed speed V, and the pressing force F were selected and set corresponding to the conditions of the material webs and the starting temperature, and if these starting conditions remain constant, the weld seam will be formed with the average thickness $D_{NM}$, and the actual pressing force F will be exactly equal to the set value $F_S$. Just as a defined set value $F_S$ of the pressing force is associated with the average weld seam thickness $D_{NM}$, a permissible upper limit value $F_{SO}$ and a permissible lower limit value $F_{SU}$ of the pressing force are also associated with the upper limit $D_{NO}$ and the lower limit $D_{NU}$, respectively.

Figure 4:
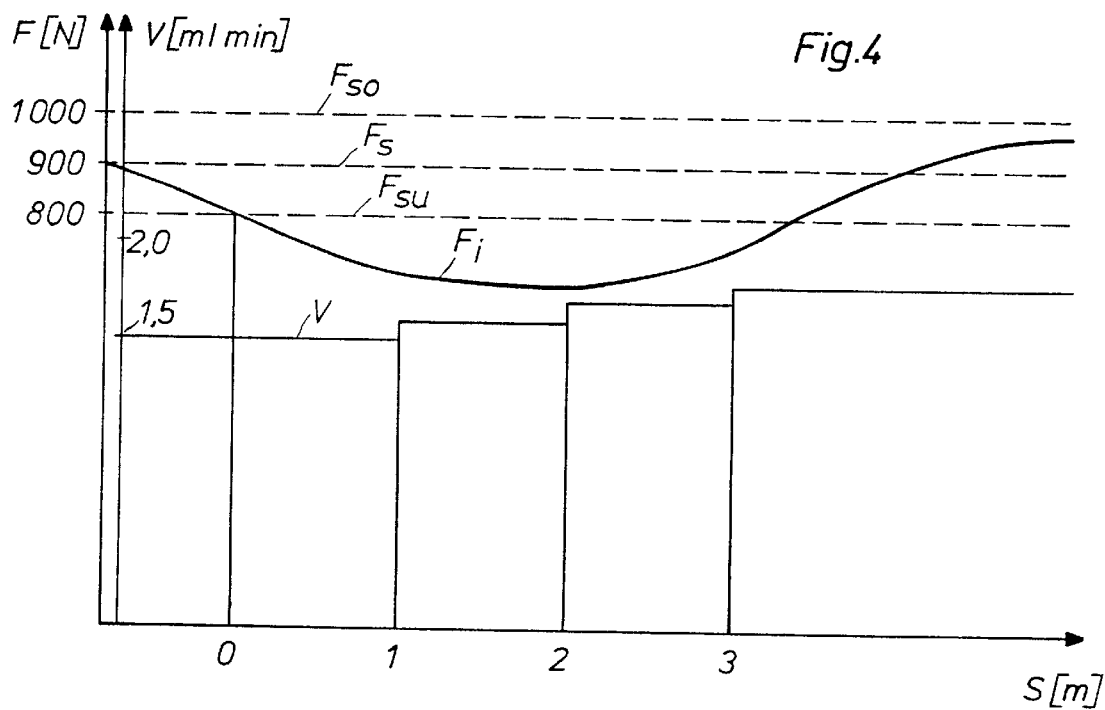
FIG. 4 is a diagram illustrating the changes in the actual value $F_i$, the pressing force F, and the amount of feed V over the path S.
Figure 5:
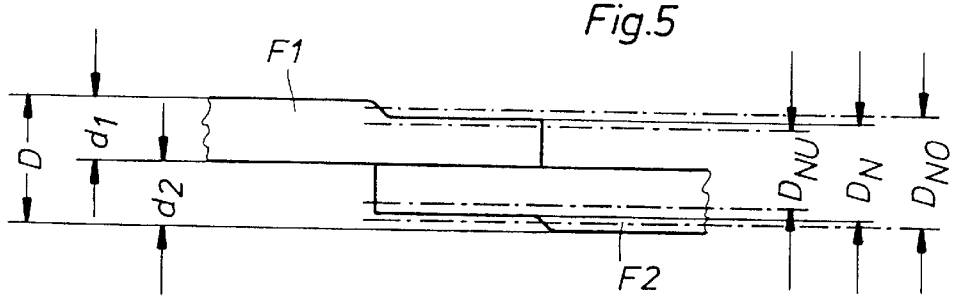
FIG. 5 is a representation of a weld seam cross section with indication of the different thicknesses and limit values.

The effect of a change in the starting temperature of the material webs F1, F2 on the pressing force of the pressure rollers 7, 13 will be investigated, using the diagram in FIG. 4, on the basis of an example, in which the feed set value is set at $V_S$=1.5 m/minute and the set value $F_S$ of the pressing force equals 900N.

If the air temperature and consequently also the starting temperature of the material webs F1, F2 slowly increase during the day during outdoor welding, the amount of heat available in the welding gap will progressively increase due to the rising starting temperature level if the heated wedge temperature T remains constant and the feed speed V is constant, and this leads to more intense plasticization of the material webs. More intense plasticization causes increasing amounts of material being squeezed out of the welding gap laterally, and consequently a decreasing thickness $D_N$ of the weld seam and, as a further consequence, a reduction in the actual value $F_i$ of the pressing force F. The welding process continues at constant feed speed as long as the actual value $F_i$ of the pressing force, which is continuously measured by means of the force sensor 37, remains above the lower limit value $F_{SU}$, or, in the case of decreasing starting temperature of the material webs, as long as it remains below the upper limit value $F_{SO}$.

When the starting temperature of the material webs F1, F2 changes abruptly to a significant degree, e.g., when it changes substantially at the time of transition from a shady area to a sunny area, there will be a larger excess of heat in the welding gap, which leads to more intense plasticization of the material webs F1, F2 and consequently to a greater reduction in the pressing force $F_i$ measured. Let us assume with reference to FIG. 4 that the actual value $F_i$ of the pressing force drops below the limit value $F_{SU}$ of 800N at point "0" of the welded section S, and consequently the thickness $D_N$ of the welded seam also drops below the lower limit $D_{NU}$. Starting from this point or this point in time, the actual value $F_i$ is checked over the next partial section with a length of 1 m to determine whether it continues to be below the limit value $F_{SU}$, or whether it has meanwhile again exceeded it. If the actual value $F_i$ is still below the limit value $F_{SU}$ after the 1-meter section, the feed speed V of the welding machine will be increased from 1.5 m/minute by 0.1 m/minute to 1.6 m/minute only beginning from this point in time. This is done by the computer 34 forming a new command variable correspondingly adjusted to the feed value of 1.6 m/minute for the speed control circuit of the motor 22 and operating the motor 22 at a correspondingly higher speed via the amplifier 35. The new value of the feed speed, V=1.6 m/minute, is maintained extensively at a constant level over a section with a length of at least 1 m by comparison of the actual value of the motor speed, measured by the tachometer generator 36, with the new command variable and by adjustment to this command variable.

An increase in the feed speed V at unchanged heated wedge temperature T now brings about a reduction in the amount of heat released by the heated wedge 5 to the material webs F1, F2, which leads to a reduction in the increase in plasticization and consequently to a slowdown in the rate of further decrease of the actual value $F_i$ of the pressing force F. This effect of the increase in the feed speed V is recognized in FIG. 4 from the fact that the course of the actual value $F_i$ of the pressing force F, recorded over the section S, is flatter beginning from point "1" compared with its course in the section up to the point "1."

Since the actual value $F_i$ of the pressing force F continues to be below the limit value $F_{SU}$ after passage over the 1-m-long section beginning from point "1" and when point "2" of the welding section S is reached, the feed speed V is again increased by 0.1 m/minute, this time to 1.7 m/minute, beginning from point "2," which causes the downward trend of the actual value $F_i$ of the pressing force F to stop and the pressing force F to increase somewhat.

Since the actual value $F_i$ of the pressing force F is still below the limit value $F_{SU}$ at point "3" after passage over the next section with a length of 1 m, which begins from point "2," the feed speed V is again increased by 0.1 m/minute, this time to 1.8 m/sec, beginning from point "3." The limit value $F_{SU}$ will be exceeded rather rapidly at this feed speed, after which the actual value $F_i$ levels off at a constant value between $F_S$ and $F_{SO}$. The welding process is continued at the new feed speed of V=1.8 m/minute as long as the actual value $F_i$ remains between the two limit values $F_{SU}$ and $F_{SO}$, and the thickness $D_N$ of the weld seam is consequently between the upper limit $D_{NO}$ and the lower limit $D_{Nu}$.

While a specific embodiment of the invention has been shown and described in detail to illustrate the application of the principles of the invention, it will be understood that the invention may be embodied otherwise without departing from such principles.

What is claimed is:

1. A process for regulating the connection of thermoplastic material webs using a welding machine equipped with a welding tool and a pair of pressure rollers, the speed of the pressure rollers bringing about a relative movement between the material webs and the welding machine, the speed being variable, the process comprising the steps of:

forming a measured value representing the weld seam thickness and comparing said measured value as an actual value of a controlled variable with a corresponding set value;

compensating a possible existing deviation between said actual value and said set value by changing a value of a heat flux into the material webs by decreasing said heat flux in the case of a decreasing weld seam thickness and increasing said heat flux in the case of increasing weld seam thickness.

2. A process according to claim 1, wherein:

a pressing force of said pressure rollers is adjustable via an adjusting mechanism provided with spring means, said measured value representing the weld seam thickness being derived from said pressing force of said pressure rollers, which is in fixed relationship with said weld seam thickness.

3. A process according to claim 2, further comprising:

using a relative speed between the material webs and the welding machine as correcting value and changing the speed of the pressure rollers to compensate a possibly existing deviation, said speed being increased in a case of decreasing weld seam thickness and said speed being decreased in a case of increasing weld seam thickness.

4. A process according to claim 3, further comprising:

regulating the motor speed, said motor speed driving said pressure rollers and forming a command variable for the pressure regulation from a set value—actual value comparison of the measured value representing the weld seam thickness.

5. A process according to claim 4, further comprising:

adjusting the speed only when the actual value drops below or exceeds a lower or upper set value during a selectable time period to avoid continual adjustments.

6. A process according to claim 1, further comprising:

using a relative speed between the material webs and the welding machine as a correcting value and changing the speed of the pressure rollers to compensate a possibly existing deviation, said speed being increased in a case of decreasing weld seam thickness and said speed being decreased in a case of increasing weld seam thickness.

7. A process according to claim 6, further comprising:

regulating the motor speed, said motor speed driving said pressure rollers and forming a command variable for the pressure regulation from a set value—actual value comparison of the measured value representing the weld seam thickness.

8. A process according to claim 7, further comprising:

adjusting the speed only when the actual value drops below or exceeds a lower or upper set value during a selectable time period to avoid continual adjustments.

9. A machine for regulating the connection of thermoplastic material webs, comprising:

a welding tool;

pressure rollers for applying welding pressure to the material webs and for bringing about a relative movement between the material webs and the welding machine;

a motor for driving said pressure rollers;

spring adjusting means for adjusting the pressure force of the pressure roller, said adjusting means including a force sensor for measuring a pressing force applied by said pressure rollers to the material webs;

computing means having a first input connected to said force sensor and having a second input receiving a set value, said computing means comparing actual value supplied by said force sensor with said set value and generating an adjusting signal for adjusting the speed of said motor depending on said comparison.

10. A machine according to claim 9, further comprising:

a tachometer generator for determining an actual speed value of said motor, an amplifier for amplifying control signals, said computer forming a speed regulating unit with said motor and said amplifier, said command variable adjusting an actual value of said pressing force to a set value of said pressing force based on a difference between said set value and said actual value of said pressing force and forming a difference between a set value and an actual value of the motor speed.

11. A process for welding thermoplastic material, the process comprising the steps of:

providing a first thermoplastic material with a portion to be welded;

providing a second thermoplastic material with a portion to be welded;

overlapping said portion of said first thermoplastic material with said portion of said second thermoplastic material;

heating one side of said portions of said first and second thermoplastic materials which are in contact with each other;

pressing said portions together to form a weld seam of said first and second materials;

measuring a parameter of said weld seam representing a thickness of said weld seam;

comparing said parameter to a set value;

varying said heating of said sides of said portions dependent on said comparing of said parameter to said set value.

12. A process in accordance with claim 11, wherein:

said measuring of said parameter includes measuring a force of said pressing of said sides.

13. A process in accordance with claim 11, wherein:

said heating of said sides is performed by passing said sides against a welding tool;

said varying of said heating is performed by varying a speed of said sides passing against said welding tool.

14. A process in accordance with claim 11, wherein:

said measuring of said parameter includes measuring a force of said pressing of said sides;

said heating of said sides is performed by passing said sides against a welding tool;

said varying of said heating is performed by varying a speed of said sides passing against said welding tool.

* * * * *